US008700559B2

(12) United States Patent
Brenes et al.

(10) Patent No.: US 8,700,559 B2
(45) Date of Patent: Apr. 15, 2014

(54) INTERFACE CHAINING TO POPULATE A CLASS-BASED MODEL

(75) Inventors: Mario Brenes, Laguna Niguel, CA (US); James Eric O'Hearn, Mission Viejo, CA (US)

(73) Assignee: Siemens Aktiengesellschaft, Munich (DE)

( * ) Notice: Subject to any disclaimer, the term of this patent is extended or adjusted under 35 U.S.C. 154(b) by 1528 days.

(21) Appl. No.: 11/220,882

(22) Filed: Sep. 6, 2005

(65) Prior Publication Data

US 2006/0218131 A1    Sep. 28, 2006

Related U.S. Application Data

(60) Provisional application No. 60/666,032, filed on Mar. 28, 2005.

(51) Int. Cl.
*G06F 7/00*     (2006.01)
*G06F 17/00*    (2006.01)

(52) U.S. Cl.
USPC .......................................................... 707/602

(58) Field of Classification Search
USPC ................................ 707/1–10, 100–104, 602
See application file for complete search history.

(56) References Cited

U.S. PATENT DOCUMENTS

| 5,487,141 | A | 1/1996 | Cain et al. |
| 5,519,866 | A | 5/1996 | Lawrence et al. |
| 5,566,330 | A | 10/1996 | Sheffield |
| 5,632,022 | A | 5/1997 | Warren et al. |
| 5,764,226 | A | 6/1998 | Consolatti et al. |
| 5,787,283 | A | 7/1998 | Chin et al. |
| 5,864,862 | A | 1/1999 | Kriens et al. |

(Continued)

FOREIGN PATENT DOCUMENTS

WO    WO 03/062934 A1    7/2003

OTHER PUBLICATIONS

Dare Obasanjo: "An Exploration of Object Oriented Database Management Systems" [Online] 2001, from Internet: URL:http://25hoursaday.com/WhyArentYouUsinginAnOOBDMS.html.

(Continued)

*Primary Examiner* — Hosain Alam
*Assistant Examiner* — Navneet K Ahluwalia
(74) *Attorney, Agent, or Firm* — Buckley, Maschoff & Talwalkar LLC

(57) ABSTRACT

Some embodiments include utilization of a first interface to query a data source using a first configuration and to return a first data set including a plurality of records, each of the plurality of records comprising data of a plurality of fields of the first data set, and reception of the first data set from the data source. Also included may be utilization of a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration, and reception of a respective second data set from the data source for each utilization of the second interface. Moreover, a class-based component model representing tag-based data and non-tag-based data may be populated with data of the respective second data sets.

26 Claims, 16 Drawing Sheets

(56) References Cited

U.S. PATENT DOCUMENTS

| | | |
|---|---|---|
| 5,945,944 A | 8/1999 | Krasner |
| 5,980,096 A | 11/1999 | Thalhammer-Reyero |
| 5,982,362 A | 11/1999 | Crater et al. |
| 5,991,534 A | 11/1999 | Hamilton et al. |
| 6,061,573 A | 5/2000 | Goldberg |
| 6,198,480 B1 | 3/2001 | Cotugno et al. |
| 6,204,808 B1 | 3/2001 | Bloebaum et al. |
| 6,208,871 B1 | 3/2001 | Hall et al. |
| 6,223,182 B1 | 4/2001 | Agarwal et al. |
| 6,336,138 B1 | 1/2002 | Caswell et al. |
| 6,381,605 B1 | 4/2002 | Kothuri et al. |
| 6,429,882 B1 | 8/2002 | Abdelnur et al. |
| 6,430,415 B1 | 8/2002 | Agashe et al. |
| 6,463,352 B1 | 10/2002 | Tadokoro et al. |
| 6,490,719 B1 | 12/2002 | Thomas |
| 6,505,205 B1 | 1/2003 | Kothuri et al. |
| 6,543,046 B1 | 4/2003 | Lunt |
| 6,609,123 B1 | 8/2003 | Cazemier et al. |
| 6,700,590 B1 | 3/2004 | DeMesa et al. |
| 6,788,249 B1 | 9/2004 | Farmer et al. |
| 6,996,566 B1 | 2/2006 | George et al. |
| 7,006,036 B2 | 2/2006 | Farmer |
| 7,069,514 B2 | 6/2006 | DeMesa |
| 2001/0001851 A1 | 5/2001 | Piety et al. |
| 2002/0184610 A1 | 12/2002 | Chong et al. |
| 2002/0186248 A1 | 12/2002 | Ramanathan et al. |
| 2003/0020703 A1 | 1/2003 | Holub |
| 2003/0058277 A1 | 3/2003 | Bowman-Amuah |
| 2003/0084190 A1 | 5/2003 | Kimball |
| 2003/0139968 A1 | 7/2003 | Ebert |
| 2003/0163329 A1 | 8/2003 | Bolene |
| 2004/0032836 A1 | 2/2004 | Grilli et al. |
| 2004/0036716 A1 | 2/2004 | Jordahl |
| 2004/0117393 A1 | 6/2004 | DeMesa et al. |
| 2004/0190378 A1 | 9/2004 | Farmer |
| 2005/0044097 A1 | 2/2005 | Singson et al. |
| 2005/0071749 A1 | 3/2005 | Goerke et al. |
| 2005/0143969 A1 | 6/2005 | DeMesa et al. |
| 2005/0144154 A1* | 6/2005 | DeMesa et al. .......... 707/1 |
| 2005/0146462 A1 | 7/2005 | Abraham et al. |
| 2005/0172306 A1 | 8/2005 | Agarwal et al. |
| 2005/0182709 A1 | 8/2005 | Belcsak et al. |
| 2005/0216555 A1 | 9/2005 | English et al. |
| 2005/0246627 A1 | 11/2005 | Sayed |
| 2006/0067334 A1* | 3/2006 | Ougarov et al. .......... 370/396 |
| 2006/0116994 A1 | 6/2006 | Jonker et al. |
| 2006/0123019 A1* | 6/2006 | Nguyen et al. .......... 707/100 |
| 2006/0200741 A1 | 9/2006 | DeMesa et al. |
| 2006/0218116 A1 | 9/2006 | O'Hearn et al. |
| 2006/0294199 A1 | 12/2006 | Bertholf |
| 2007/0124209 A1 | 5/2007 | Walker et al. |
| 2007/0208574 A1 | 9/2007 | Zheng et al. |
| 2007/0239741 A1 | 10/2007 | Jordahl |
| 2008/0018530 A1 | 1/2008 | Farmer |
| 2008/0103786 A1 | 5/2008 | Zhang et al. |
| 2010/0223296 A1 | 9/2010 | Angus et al. |

OTHER PUBLICATIONS

Heonguil, Lee, et al; "Development of a Real-Time Database Management System for Production Process-Control Applications"; Microprocessing and Microprogramming, Elsevier Science Publisher, BV., Amsterdam, NL, vol. 35, Nos. 1/5, Sep. 1, 1992 pp. 445-452.

* cited by examiner

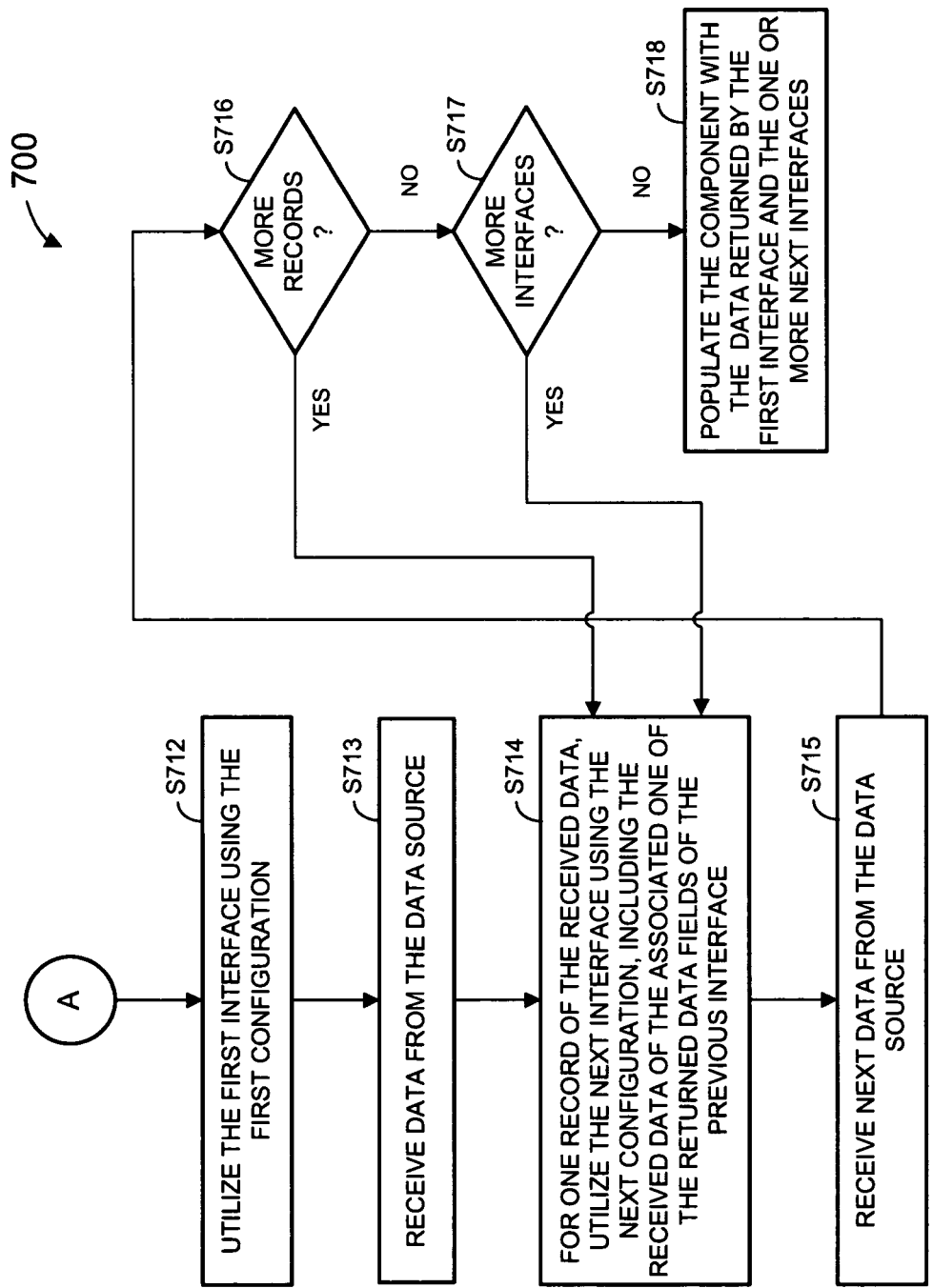

INTERFACE CHAINING TO POPULATE A CLASS-BASED MODEL

CROSS REFERENCE TO RELATED APPLICATIONS

This application claims priority to Provisional Application Ser. No. 60/666,032, filed Mar. 28, 2005 and entitled "Connecting Third-Party Software to a Tag-Based System".

BACKGROUND

1. Field

The embodiments described below relate generally to systems for importing operations data into a class-based model.

2. Discussion

Conventional industrial systems often rely to some extent on computer-based automation and monitoring. In some examples of automation and monitoring, data arising from the operation of a manufacturing plant is acquired, analyzed and responded to if necessary. The data may arise from independent sources, with each source configured to provide substantially raw or native "point" data at pre-defined intervals in real or near real-time. The point data may be presented to an operator in real or near-real time, and may include such as numerical values produced by gauges and/or monitors (e.g., speed, temperature, or pressure).

Examples of systems that may acquire, analyze, and act on point data include industrial automation systems, supervisory control and data acquisition (SCADA) systems, and general data acquisition systems. In such systems, point data may be associated with a "tag" to create a structural data element that is made accessible to other components, systems, applications and/or users. In general, point data obtained from selected sources is subject to dynamic change and is monitored and reported through various operations and functions associated with processing the point data. In industrial automation and control systems, decision support and reporting capabilities may be provided based on tag-associated point data that is monitored over very short timeframes ranging in the sub-second to sub-minute range.

Many conventional systems provide only limited capabilities to access, interpret, and/or manipulate tag-based point data collectively or in connection with "non-point" data. Non-point data relates to a broad category of context-providing information that is associated with point data and may extend the functionality and meaning of the point data. Non-point data may include descriptive and/or attribute information characterizing the point data, as well as, other information such as limits, ranges, etc. In conventional systems, integral and flexible manipulation of tag-based point data and non-point data is restricted due to the inherent differences between and properties of the two types of data.

Conventional systems also possess a limited ability to integrate and relate tag-based point data and non-tag-based data. Non-tag-based data may originate from numerous sources and relate to disparate aspects of an enterprise environment. For example, non-tag-based data may comprise data associated with conventional database applications/environments and include transactional information, production data, business data, etc. Conventionally, attempts to integrate non-tag-based data with tag-based point data may be hindered or prevented completely as a consequence of underlying differences in structure and content between these data types. As a result, generating and implementing logical constructions or schema in which both tag-based data and non-tag-based data are integrally used is problematic in conventional systems. Such limitations limit overall flexibility and increase the difficulty of scaling to complex, enterprise-level environments.

The foregoing difficulties in managing tag-based point data, non-point data, and non-tag-based data also hinder efficient access to such data. For example, a data storage system typically provides one or more mechanisms by which an external system may access the data stored therein. A database management system is a mechanism that may be capable of receiving and responding to queries that comply with a standardized query language. An external system may therefore issue such queries to access or to otherwise manipulate data associated with the database management system.

Some data storage systems support proprietary mechanisms for accessing their stored data. Accordingly, if access to the stored data is desired, external systems are limited to using the proprietary mechanisms. Some proprietary mechanisms provide external systems with rather comprehensive access capabilities. However, the capabilities of such proprietary mechanisms are inherently limited in comparison to standardized, open mechanisms such as Structured Query Language (SQL). In either of the foregoing cases, inefficiencies in accessing the data are exacerbated if the data itself is not coherently and effectively managed.

SUMMARY

In order to address the foregoing, some embodiments concern a system, a method, an apparatus, a medium storing processor-executable process steps, and means to utilize a first interface to query a data source using a first configuration and to return a first data set including a plurality of records, each of the plurality of records comprising data of a plurality of fields of the first data set, and reception of the first data set from the data source. Also provided may be utilization of a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration, and reception of a respective second data set from the data source for each utilization of the second interface. Moreover, a class-based component model representing tag-based data and non-tag-based data may be populated with data of the respective second data sets.

According to further aspects, the class-based component model may represent assets and geographies of a manufacturing organization. In some embodiments, the tag-based data and non-tag-based data are derived from an industrial process, which may comprise a continuous process and/or operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

In some embodiments, an apparatus includes a medium storing computer-executable program code, the program code comprising: code to utilize a first interface to query a data source using a first configuration and to return a first data set including a plurality of records, each of the plurality of records comprising data of a plurality of fields of the first data set; code to receive the first data set from the data source; code to utilize a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration; code to receive a respective second data set from the data source for each utilization of the second interface; and code to populate a class-based component model with data of the respective second data sets, wherein the class-based component model represents tag-based data and non-tag-based data.

In some embodiments, the code to populate the class-based component model comprises: code to populate a collection of components of a class with data of at least one of the plurality of fields of the first data set and data of the second data set.

In some embodiments, the second data set includes a second plurality of records, each of the second plurality of records including data of a second plurality of fields, and the program code further comprising: code to utilize a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration; code to receive a respective third data set from the data source for each utilization of the third interface; and code to populate the class-based component model with data of the respective third data sets.

In some embodiments, the tag-based data and non-tag-based data are derived from a continuous industrial process.

In some embodiments, the continuous industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

The appended claims are not limited to the disclosed embodiments, however, as those in the art can readily adapt the teachings herein to create other embodiments and applications.

BRIEF DESCRIPTION OF THE DRAWINGS

The construction and usage of embodiments will become readily apparent from consideration of the following specification as illustrated in the accompanying drawings, in which like reference numerals designate like parts, and wherein:

FIGS. 7A and 7B illustrate a flow diagram of process steps according to some embodiments;

DETAILED DESCRIPTION

Figure 1:
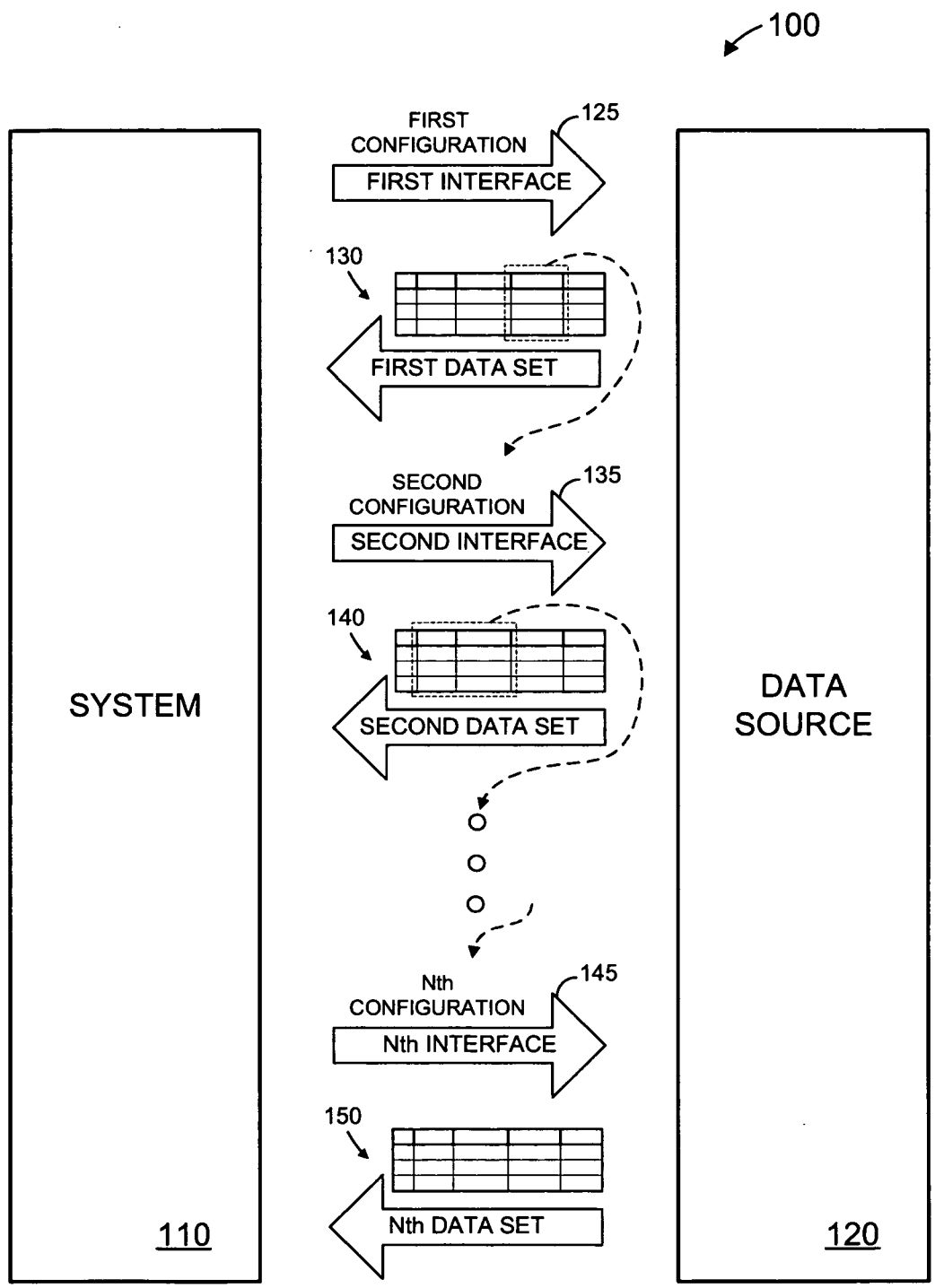
FIG. 1 is a block diagram to illustrate interface chaining according to some embodiments.

FIG. 1 is a block diagram of system 100 according to some embodiments. It should be noted that other architectures may be used in conjunction with other embodiments. System 100 includes system 110 and data source 120. System 110 may comprise any system or systems for querying data source 120 and for receiving data therefrom.

System 110 may be used to aggregate real and/or near-real time operations data arising from the operation of an industrial plant and stored in data source 120 based on a component model. Such a component model may represent tag-based operations data and non-tag-based operations data that are generated by an industrial/mechanical process. The operations data may represent any type of operation, including but not limited to batch processes, discrete processes, and/or continuous industrial processes employed in the oil industry (e.g., in an oil refinery), gas industry, and/or chemical industry.

In this regard, the various embodiments described herein can be employed in a wide variety of industries and operational facilities. Any industrial process with differing types of operations data may supply data to systems utilizing the invention. For instance, facilities involved with natural resource refinement and procurement, oil and gas procurement, oil and gas refinement, chemical synthesis and refinement, water treatment, power generation, power transmission, food and beverage processing, raw materials processing (e.g. pulp, lumber, metals, and minerals), agricultural processing and materials processing (e.g. steel mills and foundries) may be suited to utilize platforms and software built upon concepts described herein. Additionally, facilities involved in finished goods manufacturing and production such as product assembly lines may utilize one or more embodiments or systems with such features.

These facilities may have various assets, equipment, machinery, flows etc. that produce operations data which may be continuous or discrete and may involve operations data that is presented in batches. Examples include pumps, motors, tanks, pipelines, mills, lathes, mixers, assembly lines, and so on. Operations data may include data from machinery, assets, process historians, maintenance systems, enterprise resource planning systems and the like. Examples of such data include pressure, temperature, capacities, volumes, rates of flow, production totals, inventories, performance indicators and the like.

"Operations data" as used herein includes tag-based point data, non-point data and non-tag-based data. As used herein, point data may be characterized as current, real-time, or value data associated with one or more instruments, components, or portions of a manufacturing, industrial, commercial, or other system. Any of these instruments, components, or portions may be configured to generate, measure, and/or sample point data of interest. For example, a data acquisition system for a particular instrument or machine may continuously or periodically acquire data reflecting a motor's operating speed and/or operating temperature as point data from a point data source associated with the motor. In certain instances, the point data may be a simple numerical or string value. Point data may further be associated with monitoring, control, and reporting functions of various instruments, components, and applications to provide information relating to the operation of a selected system. This information may also be made available for collection and review by various data acquisition and control systems.

Point data is often acquired in a raw or unstructured form wherein the point data reflects a numerical or string value without supporting details, description, and/or attributes. As previously described, certain types of point data may be associated with real-time or near real-time information (e.g. current temperature, pressure, speed, voltage, current, etc.) that may be desirably sampled, updated or refreshed relatively frequently. The exact frequency of these operations is typically dependent on the characteristics of the point data itself and may be different across the multiple point data sources incorporated into a particular system.

A tag may therefore represent a data structure comprising selected quanta of information associated with a particular point data informational source and may also comprise certain non-point data. In conventional systems, acquisition of each tag's current value (e.g. point data-associated information) generally requires a unique configuration for each tag and possibly for each tag's attributes (e.g. non-point data). Considering that it is not uncommon for complex industrial automation applications to contain upwards of 100,000 tags, it will be appreciated that the individualized configuration and management of tags in the aforementioned manner can be very time consuming, inefficient, and error prone. Furthermore, conventional mechanisms for control, monitoring, or archiving of tag-based information tend to become even less useful when attempting to aggregate such information across multiple systems such as in the context of other plant production systems and applications.

Non-point data may take many forms, including but not limited to, attribute information, parameters, limits and other descriptive information. Certain non-point data may be associated with the point data to provide context thereto. As used herein, the terms point data and non-point data encompass various categories of information that are not necessarily constrained to the examples described herein.

Other types of non-point data may include information such as maintenance work orders (relational data or API (Application Programming Interface) structure data from maintenance systems), equipment documentation (unstructured data usually contained within operating system files and documents), and information such as URL (Uniform Resource Locator) links to supplier web sites. These types of non-point data may be associated with non-tag based information contained, for example, within Oracle™ or SAP™ databases/environments. Non-point data therefore represents a broad class of information that may be associated with point data providing a contextual and informational basis.

Data source 120 may comprise any source of any data that may receive queries from system 110 and provide data to system 110 based on the queries. System 110 and data source 120 may comprise any number of hardware and/or software elements, some of which are located remote from each other. Data of data source 120 may comprise any type of data in any type of data structure that is or becomes known.

According to some embodiments, data source 120 comprises a back-end data environment employed in an industrial context. Data source 120 may therefore comprise many disparate hardware and software systems, some of which are not interoperational with one another. Data source 120 may comprise plant floor production systems, enterprise resource planning data systems, and any other data systems according to some embodiments. Data of data source 120 may be associated with any aspect of industrial operations, and may consist of point data as well as non-point data used to characterize, contextualize, or identify the point data and/or the source of the point data.

Figure 2:
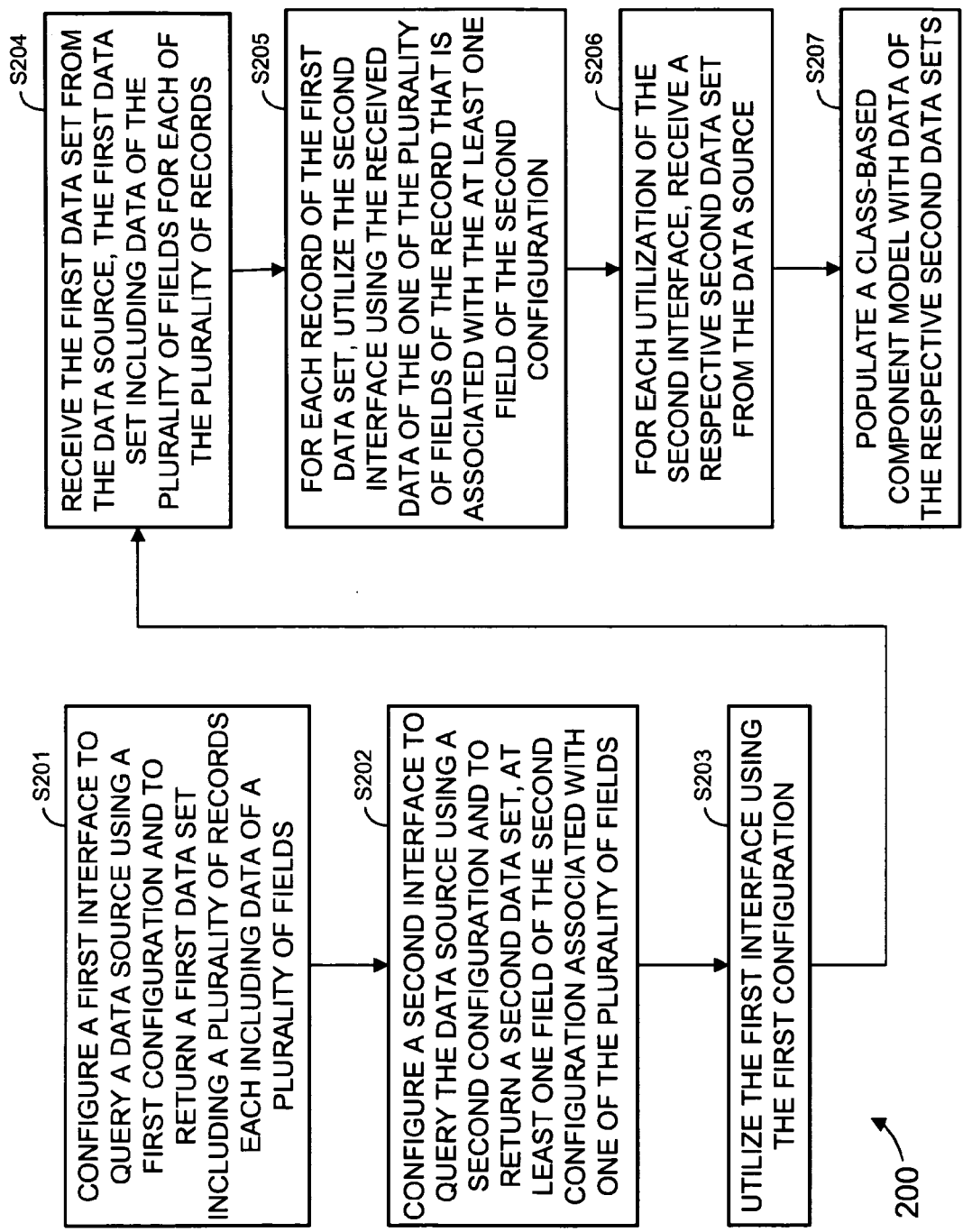
FIG. 2 illustrates a flow diagram of process steps according to some embodiments.

FIG. 2 illustrates process steps 200 for describing an operation of system 100 according to some embodiments. Process steps 200 may be embodied in one or more software or hardware elements and executed, in whole or in part, by any device or by any number of devices in combination, including but not limited to those devices illustrated in FIG. 1. Moreover, some or all of process steps 200 may be performed manually.

Process steps 200 and all other process steps mentioned herein may be embodied in processor-executable process steps read from one or more of a computer-readable medium, such as a floppy disk, a CD-ROM, a DVD-ROM, a Zip™ disk, a magnetic tape, or a signal encoding the process steps, and then stored in a compressed, uncompiled and/or encrypted format. In alternative embodiments, hard-wired circuitry may be used in place of, or in combination with, processor-executable process steps for implementation of processes according to some embodiments. Thus, embodiments are not limited to any specific combination of hardware and software.

Initially, at step S201, a first interface is configured to query a data source using a first configuration. The first interface is further configured to return a first data set that includes a plurality of records, with each of the plurality of records including data of a plurality of fields.

FIG. 1 illustrates first interface 125 according to some embodiments of step S201. First interface 125 may comprise an Application Programming Interface (API) that is exposed by data source 120 and that may be invoked by system 110. First interface 125 is associated with a first configuration that may include required and optional field values.

Configuration of first interface 125 at step S201 may comprise specifying values for each of the required first configuration and for any desired optional configurations. In this regard, a configuration may comprise structures, class instances, values, tables, and/or any other data types used to constrain an interface. According to some embodiments, a configuration may include "import parameters", which comprise a structure-like construct used to configure an SAP Business Application Interface (BAPI)® prior to invocation.

Step S201 may also comprise specifying one or more identifiers to associate with one or more fields of first data set 130. First data set 130 comprises a plurality of records that will be returned upon invocation of first interface 125. Although first data set 130 is illustrated in tabular format, some embodiments employ any currently- or hereafter-known data structure.

Next, at step S202, a second interface is configured to query the data source using a second configuration and to return a second data set. At least one field of the second configuration is associated with one of the plurality of fields of the first data set.

Second interface 135 is configured according to some embodiments of step S201. Second interface 135 may also comprise an API that is exposed by data source 120 and is invocable by system 110. The second configuration of second interface 135 is associated with a field of first data set 130 as indicated by a dashed line. In some embodiments of step S202, values are specified for all required fields of the second configuration and for any desired optional fields. At least one of the specified values of the second configuration comprises the identifier that was associated with the field as described above with respect to step S201. Step S202 may also comprise specifying one or more identifiers to associate with one or more fields of second data set 140.

Figure 3:
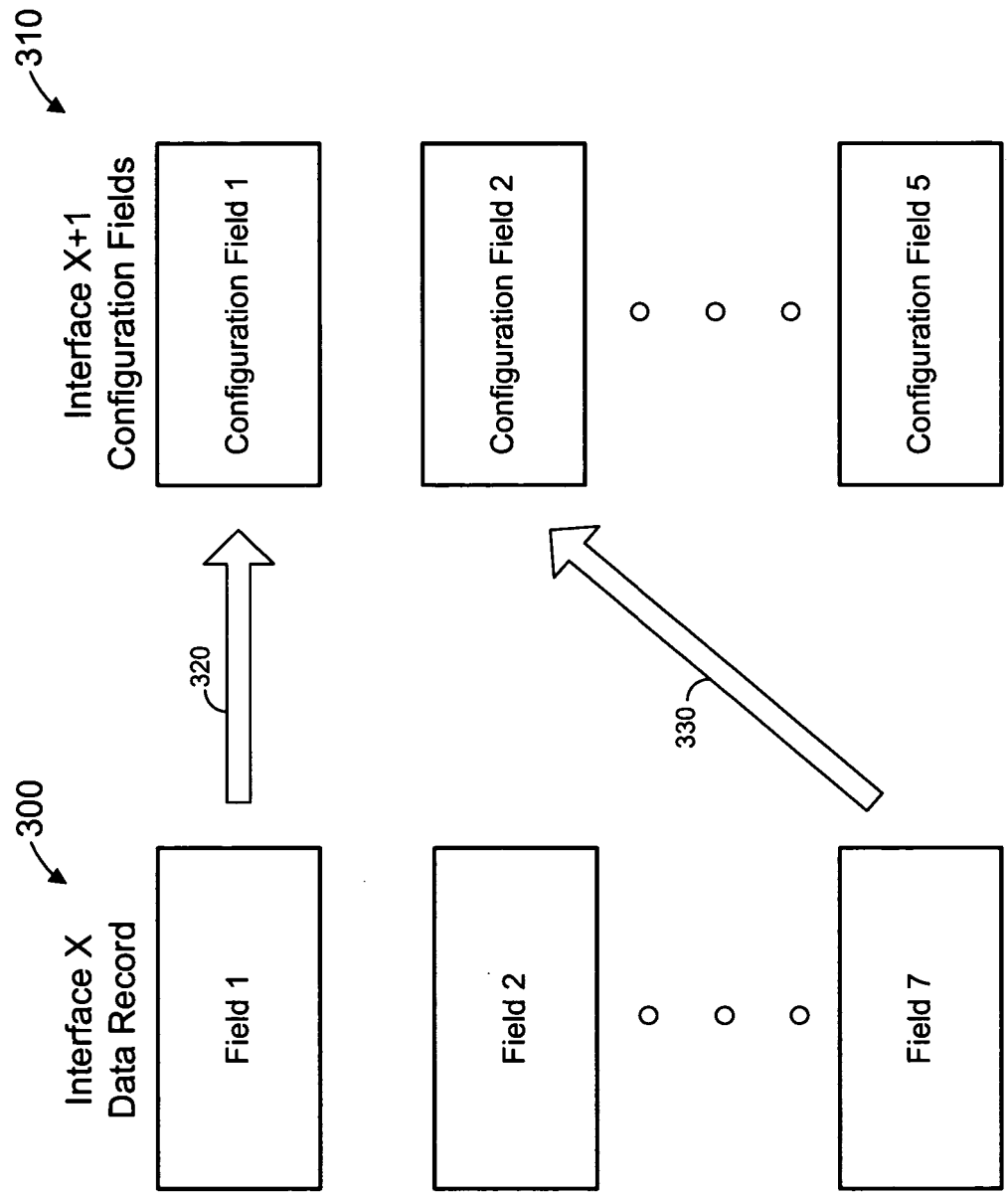
FIG. 3 is a block diagram to illustrate mapping of returned data fields to a configuration according to some embodiments.

FIG. 3 is a block diagram to illustrate some embodiments of step S202. Data record 300 represents a record of first data set 130. Configuration 310 represents a second configuration of second interface 135. Arrows 320 and 330 respectively indicate that Configuration Field 1 is associated with Field 1 of first data set 130, and that Configuration Field 2 is associated with Field 7.

The first interface is utilized at step S203 using the first configuration. In some embodiments, system 110 may invoke first interface 125 at step S203 using standardized or proprietary mechanisms. Next, at step S204, first data set 130 is received from data source 120. First data set 130 includes data of the plurality of fields for each record of first data set 130. System 110 associates data of a particular field with the identifier, if any, that was associated with the particular field at step S201. Accordingly, if first data set 130 includes three records, system 110 associates three different instances of the identifier with three data values (i.e., one data value per record) of the particular field.

The second interface is utilized at step S205 using the second configuration. The second configuration includes the data of the field of the first data set that is associated with the second configuration. The second interface is may be utilized at step S205 by invoking the second interface once for each record of the first data set. Since first data set 130 of FIG. 1 includes three records, second interface 135 is invoked three times. Each invocation uses data of a different record, but of the indicated data field.

A second data set is received from the data source at step S206 for each utilization of the second interface. In the embodiment of FIG. 1, second interface 135 is invoked three times at step S205 and system 110 receives a respective second data set 140 for each invocation at step S206. Each respective second data set 140 may include different data.

A class-based component model may be populated with data of the respective second data sets at step S207. System 110 may, for example, populate an object of the class-based component model with the received data. The class-based component model may represent tag-based data and non-tag-based data. According to some embodiments, the class-based component model represents assets and geographies of a manufacturing organization, and/or the tag-based data and non-tag-based data are generated by a continuous industrial process.

The object may include members having member names corresponding to the above-mentioned identifiers. Accordingly, the members are associated with one or more fields of second data set 140 as described above. The object may comprise a collection object that includes data of all three second data sets 140 received at step S206. The object may also include members having member names that are associated with one or more fields of first data set 130 as described above. Accordingly, system 1 may also populated the object with data of first data set 130.

Elements 145 and 150 of FIG. 1 will be described below with respect to FIGS. 7A and 7B.

Figure 4:
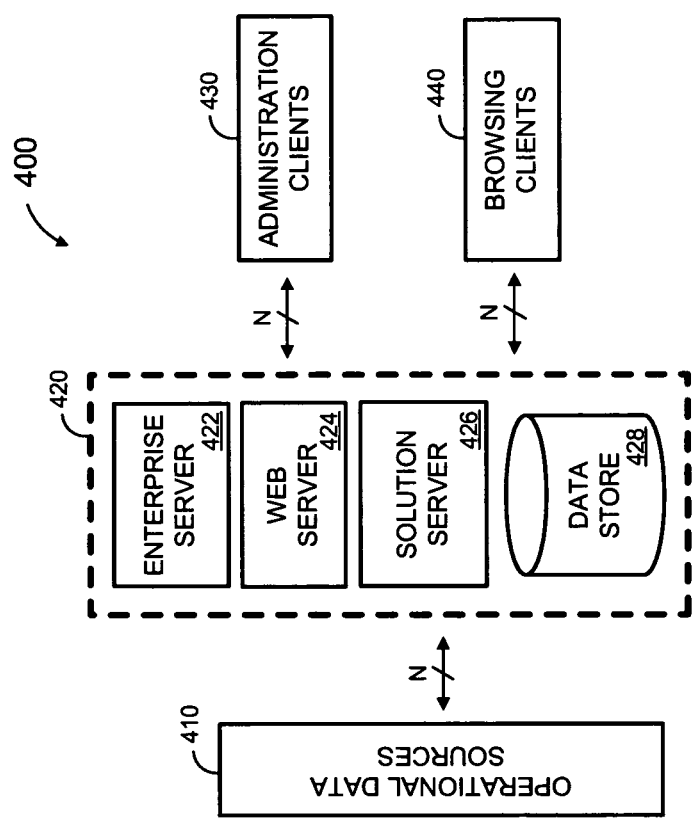
FIG. 4 is a block diagram of a system architecture according to some embodiments.

FIG. 4 illustrates an architecture of system 400 according to some embodiments. It should be noted that other architectures may be used in conjunction with other embodiments. System 400 includes operational data sources 410 in communication with application environment 420. Also in communication with application environment 420 are administration clients 430 and browsing clients 440.

As used herein, systems "in communication" with one another are directly or indirectly capable of communicating over any number of different systems for transferring data, including but not limited to a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more currently or hereafter-known transmission protocols, such as Asynchronous Transfer Mode (ATM), Internet Protocol (IP), Hypertext Transfer Protocol (HTTP) and Wireless Application Protocol (WAP).

Operational data sources 410 comprise various data sources, including but not limited to plant floor production systems, enterprise resource planning data systems, and other data systems. Operational data sources 410 may support one or more proprietary interfaces for accessing the data stored therein. An example of such an interface according to some embodiments is an SAP™ Business Application Interface. Operational data sources 410 may also provide one or more non-proprietary mechanism for accessing stored data. The stored data may represent any type of operation, including but not limited to continuous industrial processes employed in the oil, gas, and/or chemical industries.

Application environment 420 may transmit queries for data to operational data sources 410. In response, operational data sources 410 acquire and transmit the data to application environment 420. An example of this operation according to some embodiments is illustrated in FIG. 1 and described above with respect to FIG. 2. The operation of system 400 according to some embodiments of process steps 200 will be described below with respect to FIGS. 7A and 7B.

Application environment 420 may comprise enterprise server 422, Web server 424, solution server 426, and data store 428. Application environment 420 may comprise a single server device or multiple devices. In various embodiments, enterprise server 422 and solution server 426 comprise application programs developed in Java and/or C++ and running under Windows XP/NT/2000/2003.

Web server 424 manages data communication between application environment 420, administration clients 430, and browsing clients 440. One or more administration clients 430 and browsing clients 440 may execute one or more Java applets to interact with Java servlets of Web server 424 according to some embodiments.

Solution server 426 is used to access data from operational data sources 410. In some embodiments, solution server 426 includes connection groups and connection processes. A connection group includes one or more object instances, each of which is associated with a particular data source of operational data sources 410. Different connection groups are associated with different data sources.

A connection process comprises processor-executable process steps to retrieve data from a particular type of data source (e.g., an SAP R/3™ server). A connection process may comply with standard or proprietary protocols, including but not limited to ODBC, JDBC, OPC DA, OPC HDA, OPC AE, and Web Services. Process steps to retrieve data from a particular type of data source may be provided in a library by an owner of a proprietary interface for accessing the particular type of data source.

Accordingly, several different connection groups may use a same connection process to access their respective data sources. Moreover, each object instance includes scripts (e.g. Structured Query Language scripts) to populate itself based on retrieved data. Solution server 426 manages the objects, connection groups and connection processes to access data that is acquired and stored by disparate systems of operational data sources 410.

Solution server 426 may transmit the data acquired from operational data sources 410 to data store 450 for storage according to some embodiments. Data store 450 may store any data used during the operation of application environment 420. Data may be stored in data store 450 according to any currently- or hereafter-known protocol for storing data, including but not limited to a class-based component and view model. Data store 450 may comprise a front-end application that is usable to access and/or manage the data stored therein. Such a front-end application may support Structured Query Language commands or the like. According to some embodiments, data store 450 may receive data directly from operational data sources 410.

Administration clients 430 may provide user interfaces to perform administration functions for operating system 400. For example, an administrator may manipulate a user interface displayed by one of administration clients 430 to configure a first interface and a second interface as described with respect to process steps 200. Information received by the user interfaces may be received by Web server 424 and transmitted to data store 428. Examples of administration clients 430 according to some embodiments include but are not limited to a desktop computer, a laptop computer, a computer terminal, a personal digital assistant, a telephone, and a tablet computer.

Browsing clients 440 may present views of data contained in data store 428. Such views may include real or near-real time data and may include data stored in data store 428 in an object-oriented format. Browsing clients 440 may provide any suitable client application such as a Web browser or a Java applet. As such, a browsing client 440 may be connected to application environment 420 through the Internet or through an Intranet. Browsing clients 40 may comprise any suitable user devices, including but not limited to those mentioned above with respect to administration clients 430.

In some embodiments, the elements of FIG. 4 are connected differently than as shown, and each block shown is implemented by one or more hardware and software elements. The hardware and software elements of one or more blocks may be located remotely from each other. Some embodiments may include environments, systems, servers, and clients that are different from those shown.

Figure 5:
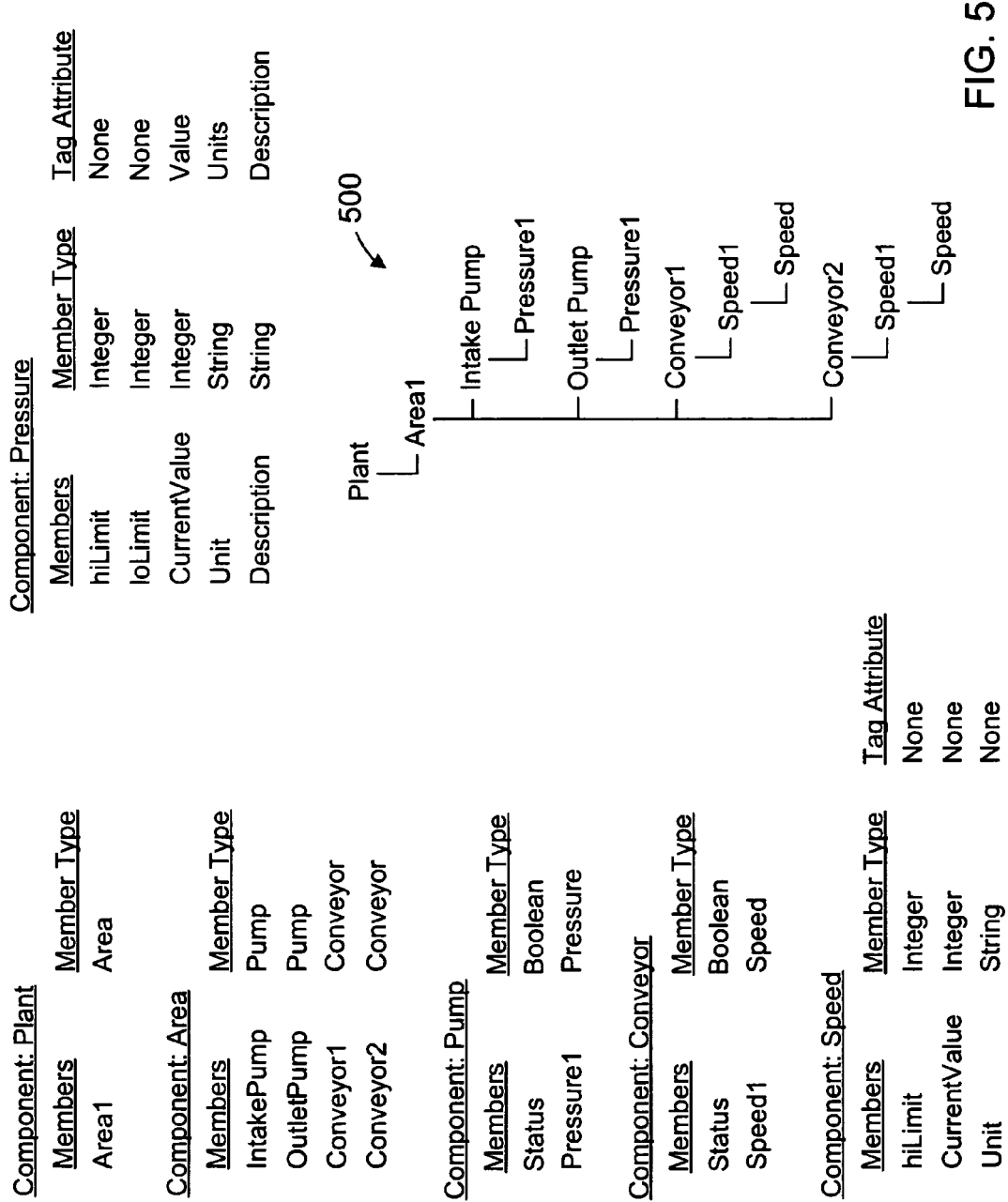
FIG. 5 is an illustration of a component model according to some embodiments.

FIG. 5 illustrates component model 500 according to some embodiments. Application environment 420 may store and manage component model 500 to represent tag-based data and non-tag-based data that are generated by a continuous industrial process. In this regard, data store 428 stores data in the form of objects instantiated based on components of component model 500.

In some embodiments, the tag-based data may be generated by and received from SCADA, HMI, DCS, plant historians, etc., and the non-tag-based data may be generated by and received from business systems and applications (e.g., SAP (ERP), Oracle Manufacturing Apps, general database apps, etc). Moreover, component model 500 may represent assets and geographies of a plant or manufacturing organization.

Commonly-assigned U.S. Pat. No. 6,700,590 describes a system to use a class-based object and view model to collect and display data received from multiple heterogeneous sources. This system encapsulates received tag-based data and non-tag-based data as objects, which are instantiations of defined components. The use of components and objects may provide reusability, consistency, inheritance and other benefits known to those familiar with object-oriented techniques. Component model 500 may be established and utilized in any manner, including but not limited to those specified in aforementioned U.S. Pat. No. 6,700,590 and/or U.S. Patent Application Publication No. 2005/0144154, the contents of which are herein incorporated by reference for all purposes. Component model 500 may follow any suitable modeling protocol or format; including those mentioned in the foregoing references.

Each component of component model 500 includes at least one member, and each component member is associated with a member type. A member of a first component may be a second component, in which case the associated member type is the name of the second component. All members that are associated with "primitive" member types (which include anything other than another component) are either associated with a tag attribute or not (i.e. "None").

Component model 500 of FIG. 5 is shown in a tree or hierarchical format which facilitates visualization and understanding of the relationships and patterns of inheritance/instantiations for the various component definitions of FIG. 5. Component model 500 may therefore be displayed to an administrator or user according to some embodiments. In the illustrated embodiment, only components whose members are not associated with tag attributes are displayed in component model 500.

Figure 6:
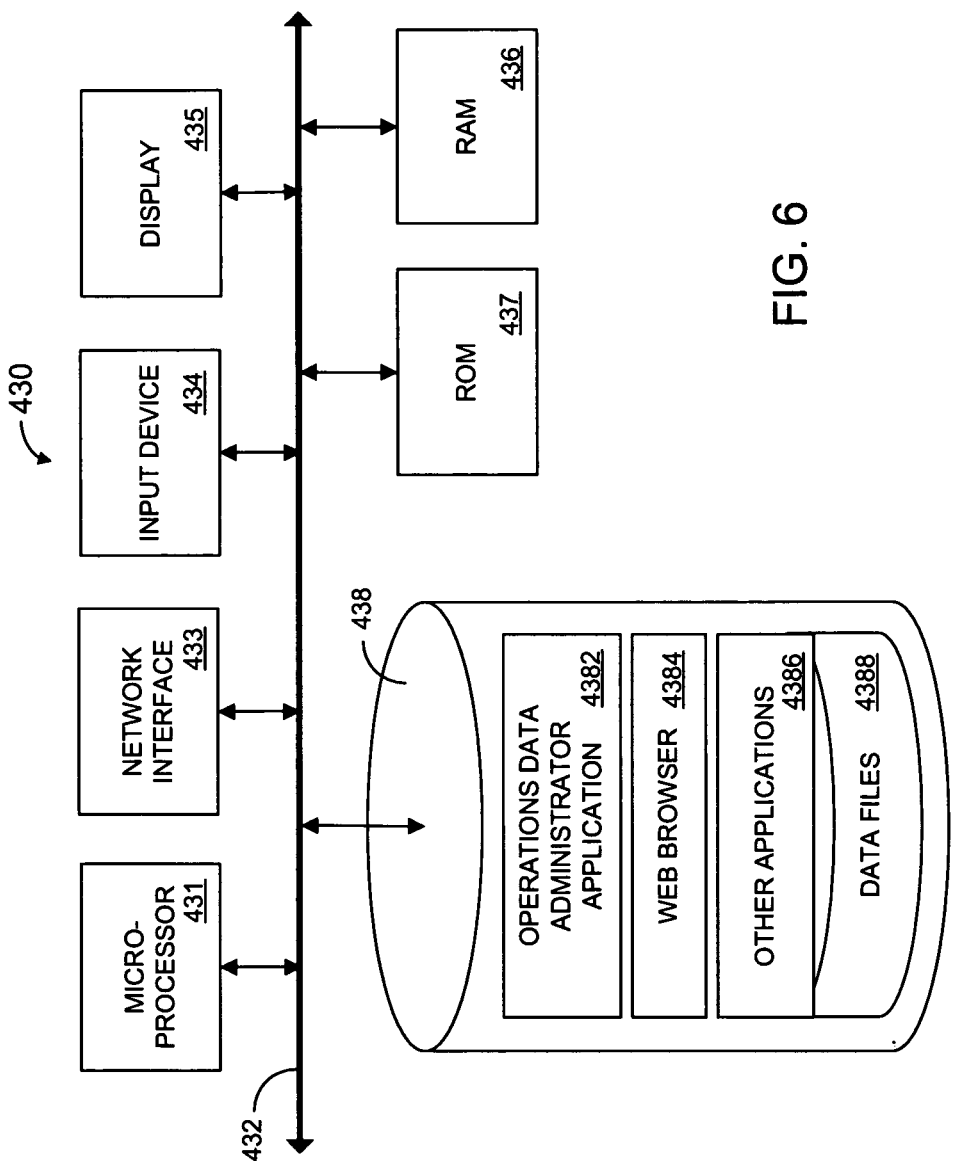
FIG. 6 is a block diagram illustrating an internal architecture of an administration device according to some embodiments.

FIG. 6 is a block diagram of an internal architecture of administration client 430 according to some embodiments. Administration device 430 may operate to configure a first interface to query one of operational data sources 410 using a first configuration and to return a first data set including a plurality of records, with each of the plurality of records comprising data of a plurality of fields. Administration device 430 may further operate to configure a second interface to query the data source using a second configuration and to return a second data set, wherein at least one field of the second configuration is associated with one of the plurality of fields.

Administration device 430 includes microprocessor 431 in communication with communication bus 432. Microprocessor 431 may comprise an Intel Itanium™ microprocessor or other type of processor and is used to execute processor-executable process steps so as to control the elements of administration device 430 to provide desired functionality.

Also in communication with communication bus 432 is network interface 433. Network interface 433 is used to transmit data to and to receive data from devices external to administration device 430 such as a device housing Web server 424. Network interface 433 is therefore preferably configured with hardware suitable to physically interface with desired external devices and/or network connections. For example, network interface 433 may comprise an Ethernet connection to a local area network through which administration device 430 may receive and transmit information over the Web.

Input device 434 and display 435 are also in communication with communication bus 432. Any known input device may comprise input device 434, including a keyboard, mouse, touch pad, voice-recognition system, or any combination of these devices. Of course, information may also be input to administration device 430 via network interface 433. Display 435 may be an integral or separate CRT display, flat-panel display or the like used to present graphics and text in response to commands issued by microprocessor 431.

According to some embodiments, display 435 displays user interfaces that may be manipulated by an administrator using input device 434 to configure a first interface and a second interface as mentioned above. Some examples of such user interfaces are described below.

RAM 436 is connected to communication bus 432 to provide microprocessor 431 with fast data storage and retrieval. In this regard, processor-executable process steps being executed by microprocessor 431 are typically stored temporarily in RAM 436 and executed therefrom by microprocessor 431. ROM 437, in contrast, provides storage from which data can be retrieved but to which data cannot be stored. Accordingly, ROM 437 may be used to store invariant process steps and other data, such as basic input/output instructions and data used during boot-up of administration device 430 or to control network interface 433. One or both of RAM 436 and ROM 437 may communicate directly with microprocessor 431 instead of over communication bus 432.

Data storage device 438 stores, among other data, processor-executable process steps of operations data administrator application 4382. Administration device 430 may execute process steps of operations data administrator application 4382 to provide the functions attributed herein to administrator device 430. Operations data administrator application 4382 may comprise a Java applet or a standalone application suitable for the operating system of administration device 4382.

Web browser 4384 may comprise processor-executable process steps of a Web client. As such, administration device 430 may execute process steps of Web browser 4384 to request and receive Web pages from a Web server such as Web server 424. A Java applet such as operations data administrator application 4382 may execute within an execution engine provided by Web browser 4384.

Data storage device 438 also includes processor-executable process steps of other applications 4386. Other applications 4386 may include process steps to perform calendaring, e-mail functions, word processing, accounting, presentation development and the like. Data storage device 438 may also store process steps of an operating system (unshown). An operating system provides a platform for executing applications, device drivers and other process steps that interact with elements of administration device 430. Data files 4388 may include any electronic files usable by any application of administration device 430.

Figure 7A:
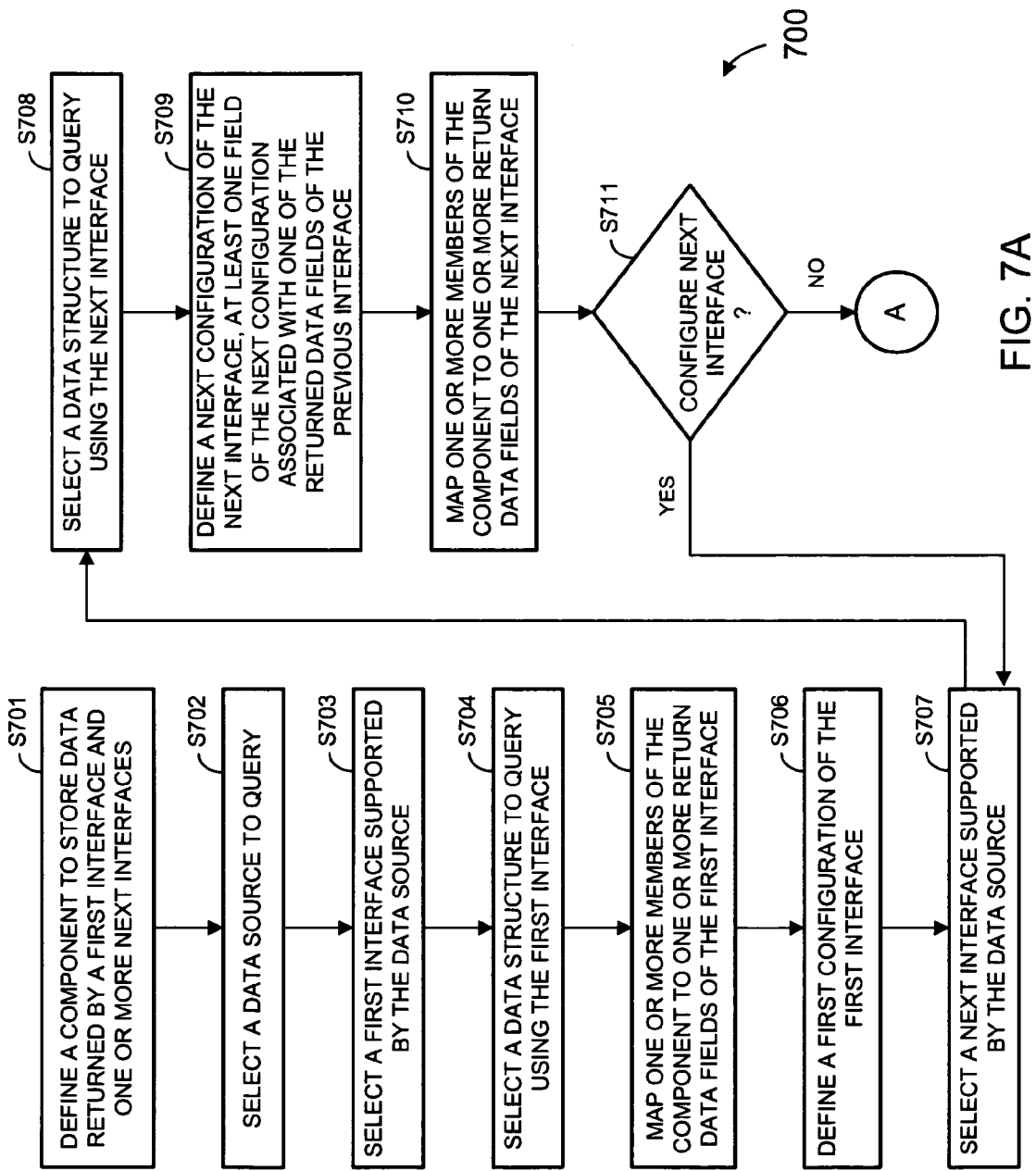

FIGS. 7A and 7B illustrate process steps 700 according to some embodiments. Process steps 700 may be embodied in one or more software or hardware elements and executed, in whole or in part, by any device or by any number of devices in combination, including by application environment 420.

Initially, at step S701, a component to store data is defined. The data is returned by a first interface and one or more next interfaces as will be described below. The component may comply with a class-based component and view model such as that described in above-mentioned U.S. Pat. No. 6,700,590, but embodiments are not limited thereto. The component may comprise a class from which one or more objects may be instantiated as is known in object-oriented programming.

The component may be defined in any suitable manner that is or becomes known. According to some embodiments, an administrator operates input device 434 of administration client 430 to specify a component name and one or more members of the component. In the example below, the defined component includes members that may be used to determine a cost of a particular type of inventoried material. The defined component may include scripts to populate itself based on retrieved data, and may be added to a component model such as component model 500 of FIG. 5.

A data source is selected in step S702. The selected data source is to be queried using the first and next interfaces. The data source may comprise any system for storing data. According to some embodiments, the selected data source supports proprietary interfaces for accessing the data stored therein.

The data source may be selected at step S702 by selecting a connection process and/or a connection group. As described above, different connection groups are associated with different data sources, and a connection process may be associated with one or more connection groups.

Figure 8:
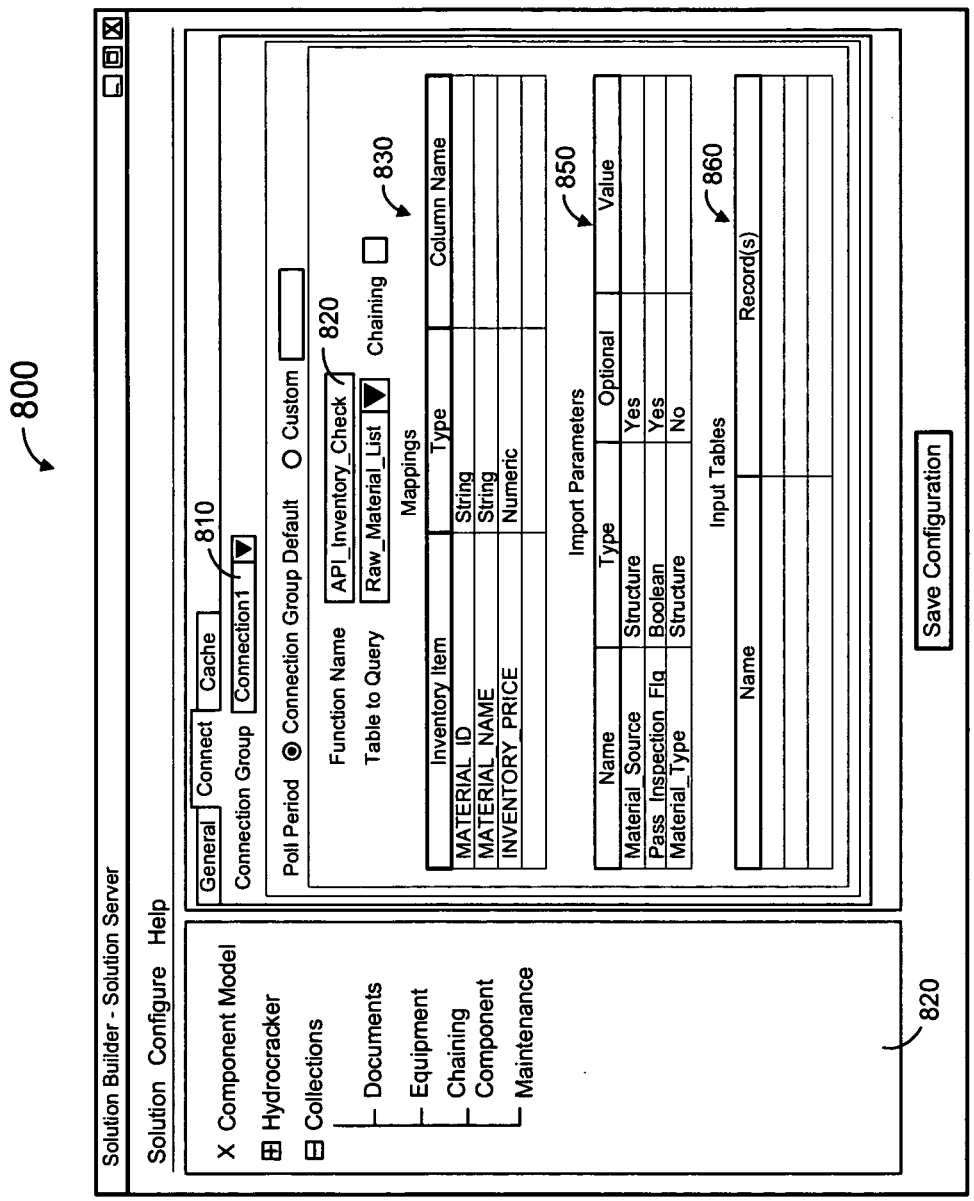
FIG. 8 is an outward view of a user interface according to some embodiments.

FIG. 8 is an outward view of user interface 800 that may be used in conjunction with some embodiments of step S702. User interface 800 may be presented to an administrator on display 435 of administration client 430. More specifically, administration client 430 may execute operations data administrator application 4382 to request access to a configuration utility served by application environment 420. In some embodiments, administration client 430 executes Web browser 4384 to request access from Web server 424 of application environment 420.

Application environment 420 may perform any required authentication and/or security checks before transmitting user interface 800 (e.g., as a Web page) to administration client 430. Embodiments are not limited to the function, appearance or arrangement of the user interfaces described herein.

User interface 800 includes connection group field 810 for specifying a connection group (and a respective data source) to query. The connection group is associated with a data source and also with a connector process for accessing the data source. The connector process may comprise proprietary process steps usable to invoke proprietary interfaces supported by the data source. The proprietary process may be provided in a library (e.g., a Java Connector library) available to application environment 240.

User interface 800 also includes component area 820 for displaying a component model. The component model is expanded to present the component "chaining component" defined in step S701. The component has been selected, and therefore its members are presented in Mappings table 830 of interface 800. Also displayed are data types associated with each member.

A first interface is selected in step S703. The first interface may comprise an API that is exposed by the selected data source and that may be invoked by application environment 420. The first interface is to query the selected data source using the first configuration. The first interface is also to return a first data set that includes a plurality of records, with each of the plurality of records including data of a plurality of fields. The first interface is selected in the present example by populating function name field 840 with a name of the first interface.

Configuration table 850 shows the first configuration of the first interface. One or more of fields of the configuration may be required as specified in table 850. Table 850 also presents a data type associated with each field of the configuration and allows entry of a value for each field of the configuration.

Input tables table 850 displays information related to any input tables of the first interface. According to the present example, the configuration of the selected first interface does not include any input tables. Some configurations may include both import parameters and input tables, and other configurations may include only input tables. Any type of data structure may be used as input to an interface according to some embodiments.

At step S704, an administrator selects a data structure to query using the first interface. According to some embodiments, the first interface is capable of querying a particular set of tables. These tables are listed by and selectable via pull-down menu 870.

One or more members of the selected component are mapped to one or more return data fields of the first interface at step S705. The return data fields comprise fields of each record that is returned by the first interface. To perform this mapping according to some embodiments, the administrator first selects an empty field in the Column Name column of table 830.

Figure 9:
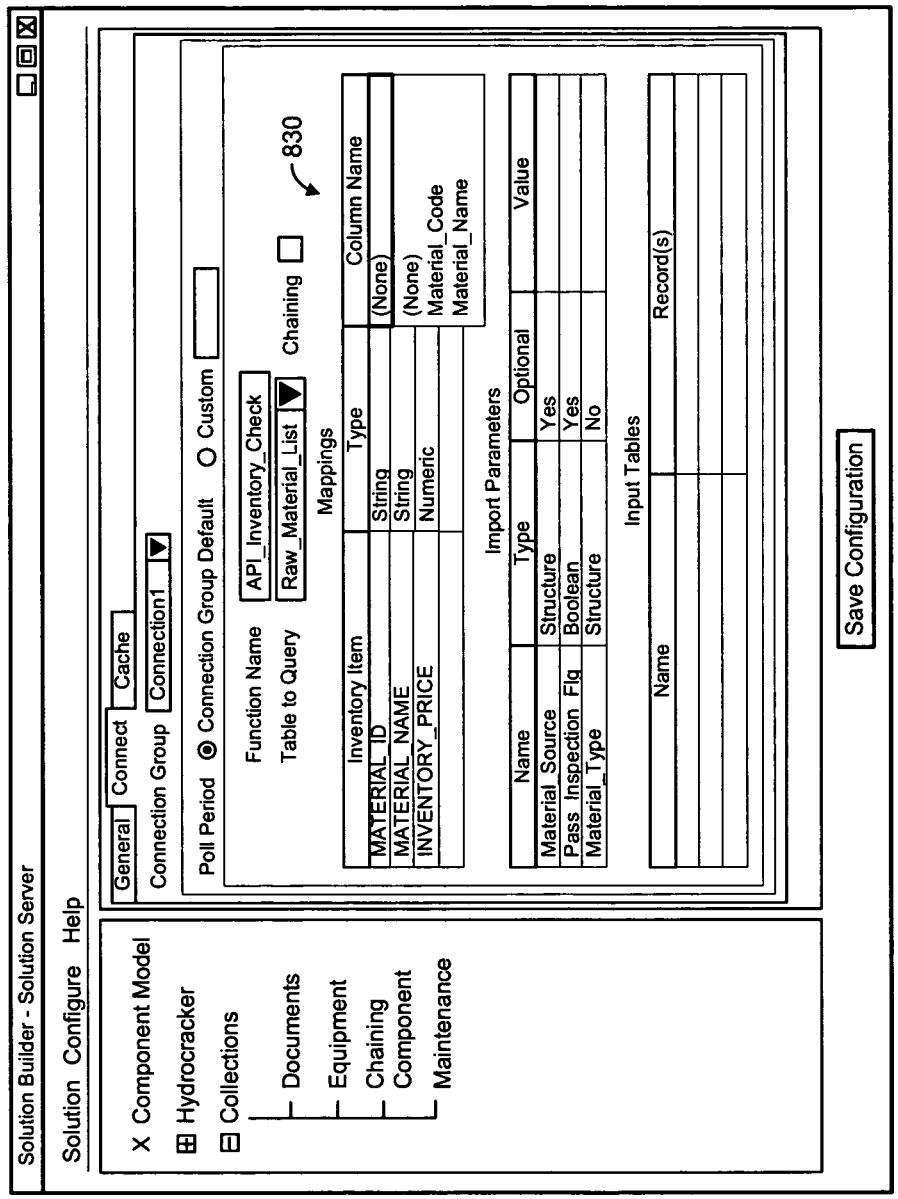
FIG. 9 is an outward view of a user interface according to some embodiments.
Figure 10:
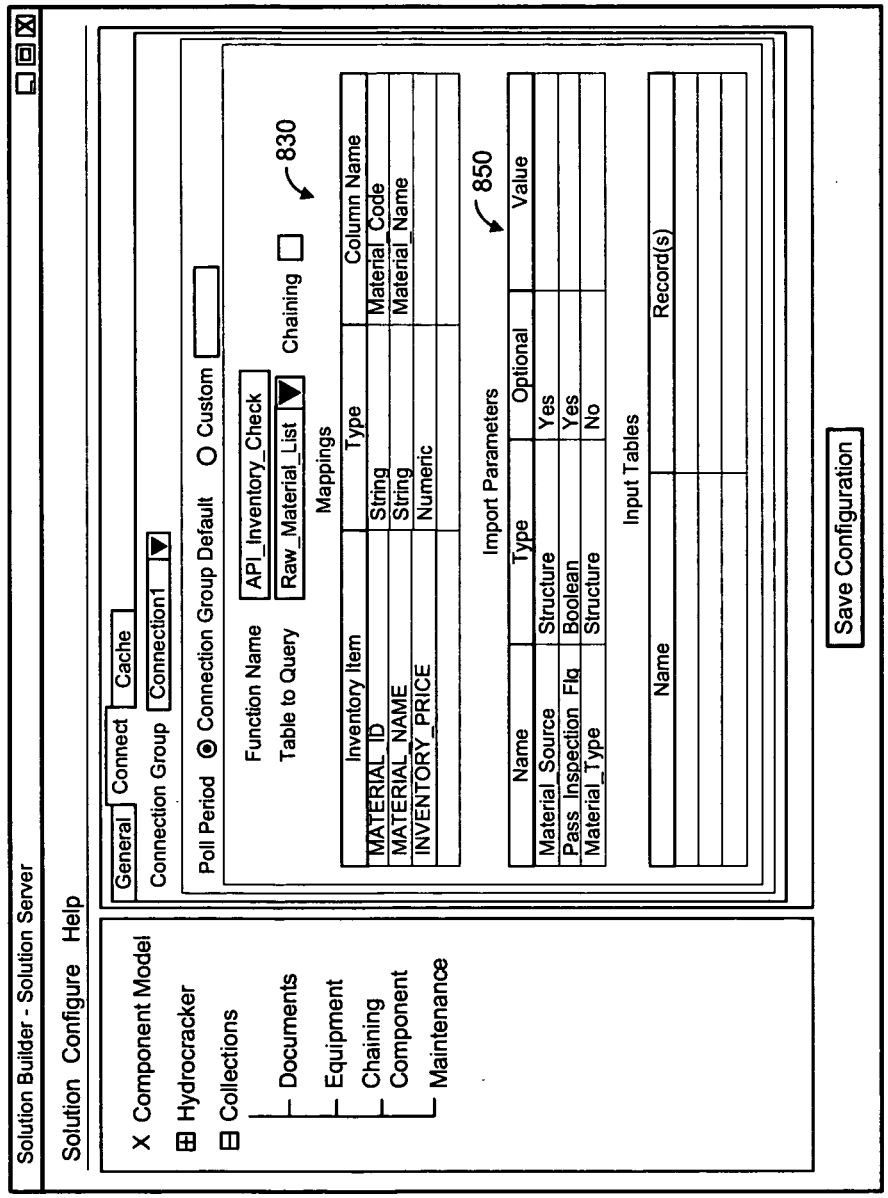
FIG. 10 is an outward view of a user interface according to some embodiments.

FIG. 9 is a view of user interface 800 after selection of the empty field. As shown, a pull-down menu is displayed including names of the return data fields associated with the first interface. The empty field may be populated by selecting one of the displayed names. FIG. 10 is a view of interface 800 after mapping two members of the component to two return data fields of the first interface.

Figure 11:
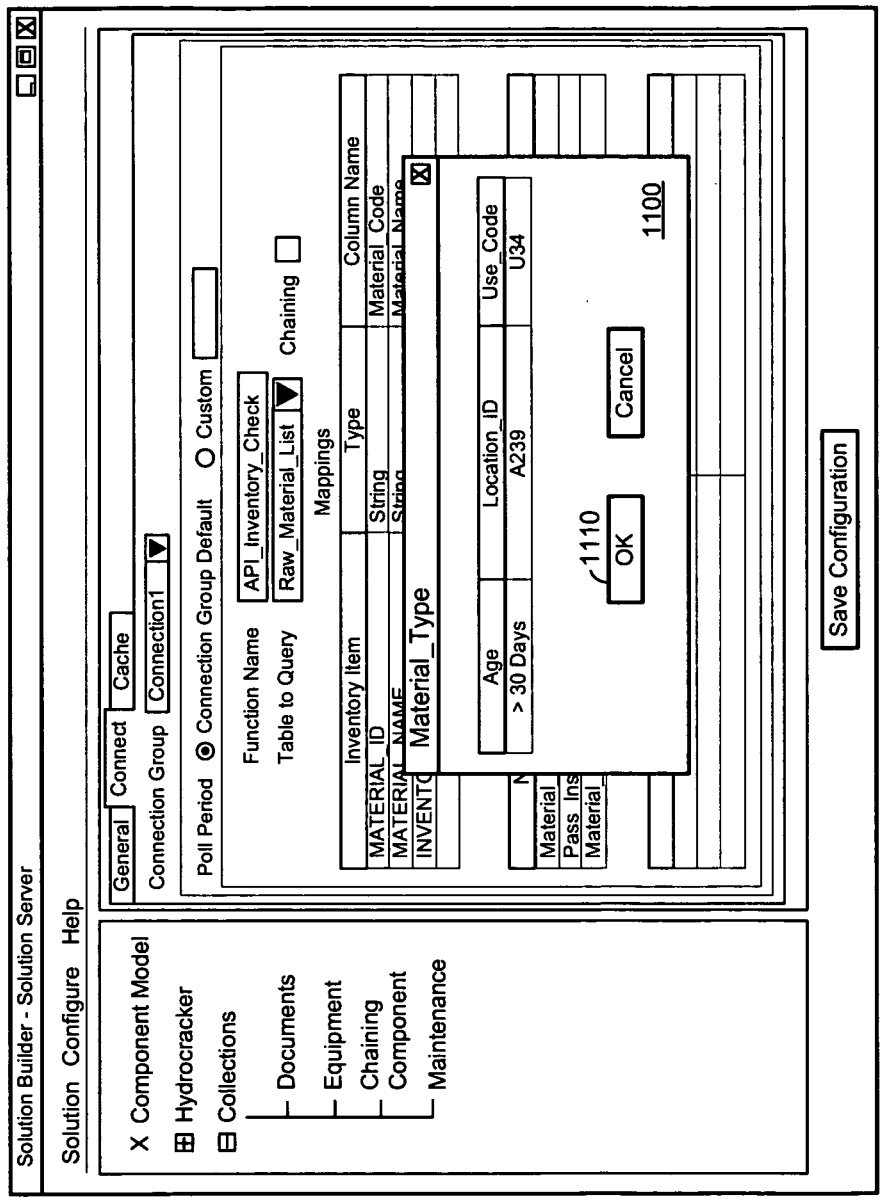
FIG. 11 is an outward view of a user interface according to some embodiments.

The configuration of the first interface is defined at step S706. Accordingly, steps S706 may comprise assigning values to one or more fields of the first configuration of the first interface. In the present example, the administrator selects a field in the Value column of table 850 and is presented with a window as shown in FIG. 11.

Figure 12:
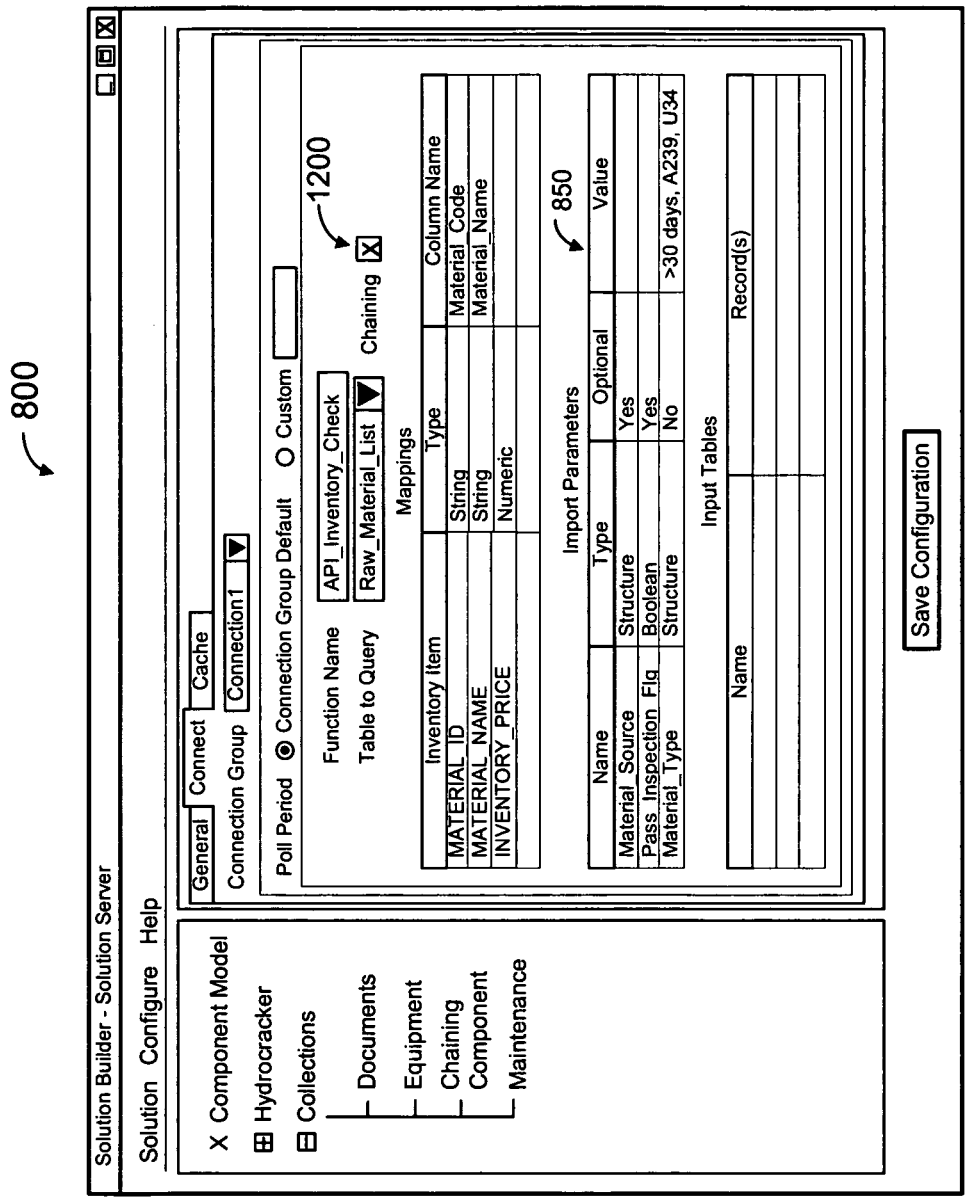
FIG. 12 is an outward view of a user interface according to some embodiments.
Figure 13:
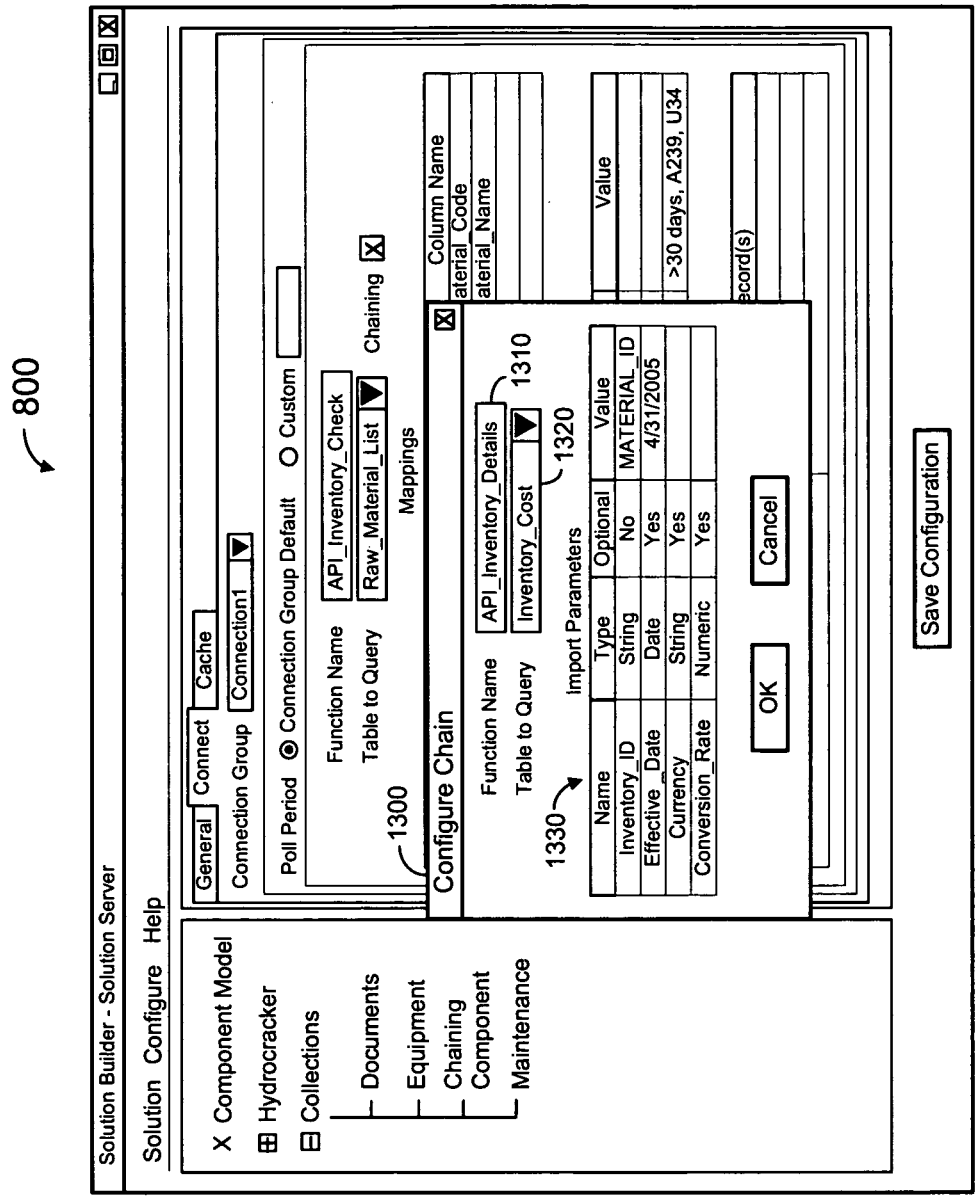
FIG. 13 is an outward view of a user interface according to some embodiments.

Window 1100 is associated with the selected field. Window 1100 allows the administrator to specify values of data structure members associated with the field. After specifying the values and selecting OK icon 1110, the field of table 850 is populated with the specified values as shown in FIG. 12.

A next interface supported by the data source is selected at step S707. The next interface may correspond to second interface 135 of FIG. 1. According to the present example, the administrator selects Chaining checkbox 1200 in step S707 as shown in FIG. 12. Window 1300 of FIG. 1300 is displayed as a result of the selection.

The name of the next interface may be specified in field 1310 of window 1300. The next interface may also be supported by the selected data source and invoked by application environment 420. The administrator then selects a data structure to query using the next interface at step S708. The data structure may be selected via pull-down menu 1320. In this regard, pull-down menu 1320 may list a particular set of tables that may be queried using next interface.

A configuration of the next interface is defined at step S709. As described with respect to FIG. 1, at least one field of the defined configuration is associated with one of the returned data fields of the previous (i.e. first) interface. Import parameters table 1330 lists import parameters of the next interface, along with a data type of each parameter and an indication of whether each parameter is optional or required. According to the present example, the selected next interface is not associated with any input tables.

The administrator may input values for one or more of the import parameters in the Value column of table 1330. As shown, the values may comprise dates, strings, numbers or any suitable data type. An input value for a particular import parameter may also comprise a member name of the component defined in step S701. The member name is associated with a returned data field of the first interface as shown in table 830. Accordingly, the particular import parameter (i.e., field of the configuration) is associated with the returned data field.

One or more members of the selected component are mapped to one or more return data fields of the next interface at step S710. The return data fields comprise fields of each record that is returned by the next interface. The administrator performs this mapping by first selecting an empty field in the Column Name column of table 830.

Figure 14:
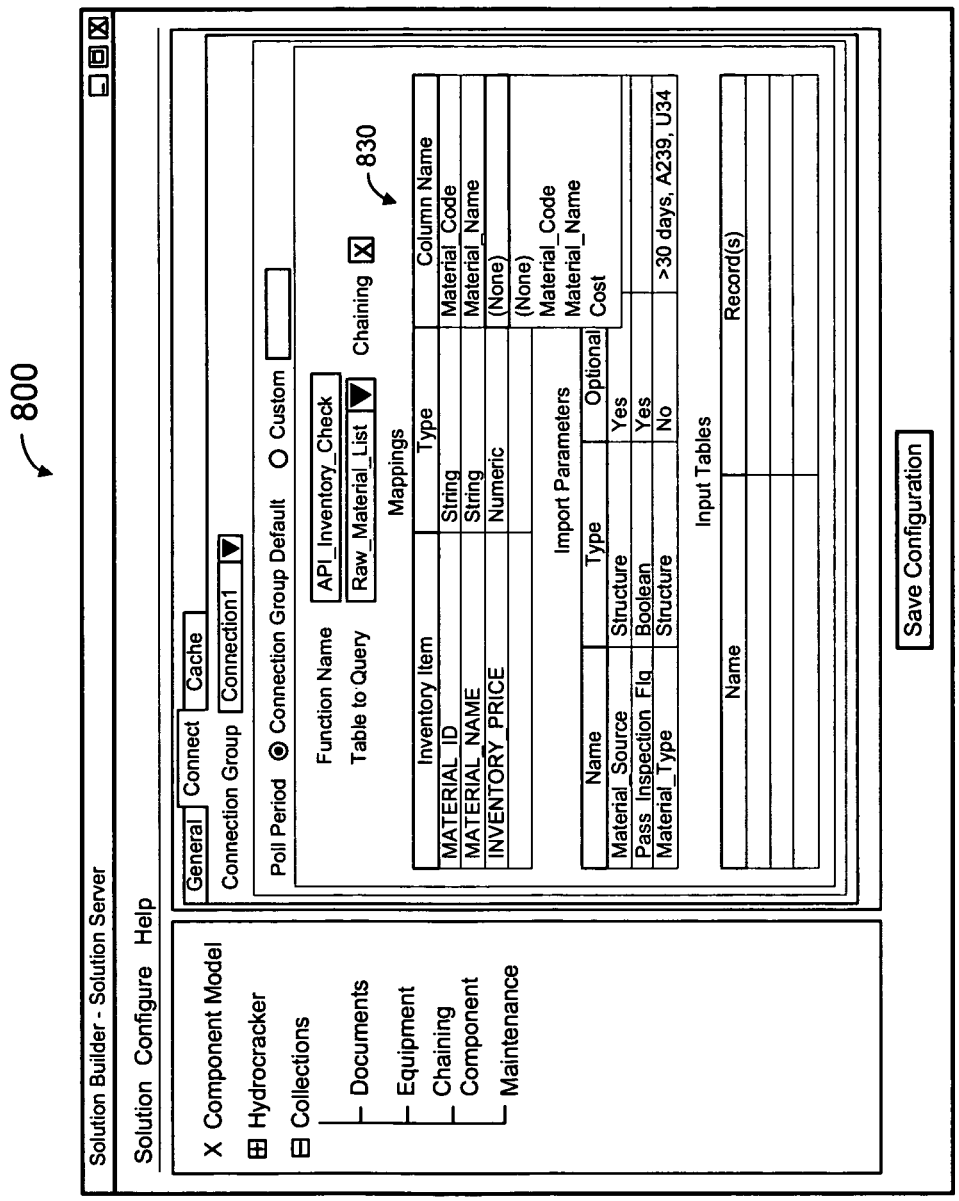
FIG. 14 is an outward view of a user interface according to some embodiments.
Figure 15:
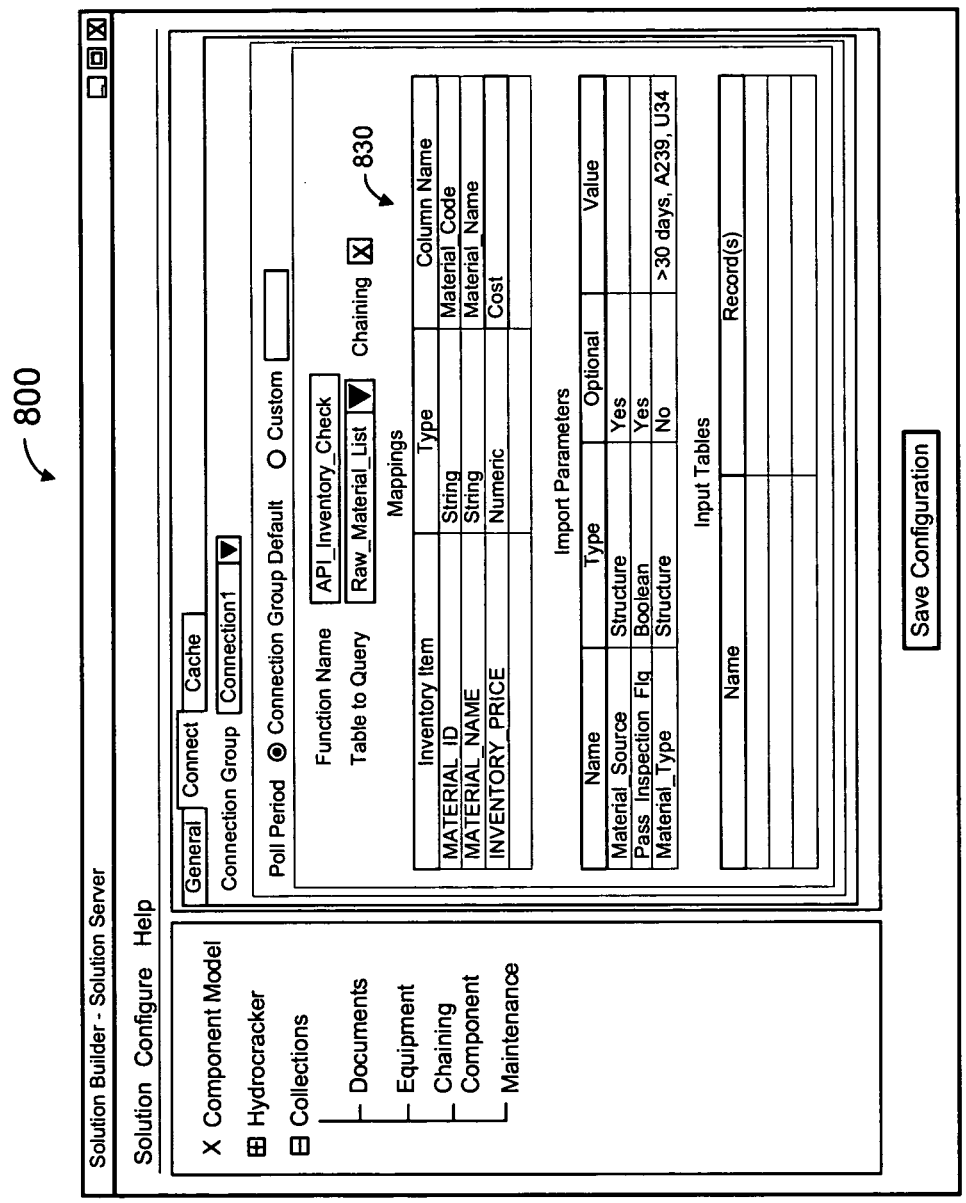
FIG. 15 is an outward view of a user interface according to some embodiments.

FIG. 14 illustrates user interface 800 after selection of the empty field of table 830 that is associated with the INVENTORY_PRICE component member. As shown, a pull-down menu is displayed including names of the return data fields associated with the first interface and the return data fields associated with the next interface. The administrator may populate the empty field by selecting one of the displayed names. FIG. 15 is a view of interface 800 after mapping a return data field of the next interface to the INVENTORY_PRICE component member.

Some embodiments allow the administrator to configure additional interfaces for the present interface chain. Accordingly, it is determined at step S711 whether additional interfaces are to be configured. If so, flow returns to step S711 for selection of a next interface. Flow then continues as described above. For example, a configuration of the next interface is defined at step S709, with at least one field of the defined configuration being associated with one of the returned data fields of the prior "next" (i.e., second) interface. One or more of the fields may also be associated with one of the returned data fields of the first interface. Flow proceeds to step S712 if no further interfaces are to be configured.

The first interface is utilized using the first configuration at step S712. Application environment 420 may execute proprietary process steps of a connector process at step S712 to invoke first interface at step S712. Data is received from the data source at step S713 in response to the utilization. As described with respect to FIG. 1, the received data comprises a plurality of records. Each record includes data for a plurality of fields such as those illustrated in the pull-down field of table 830 shown in FIG. 9. In this regard, data of a particular field may be associated with the component member that was mapped to the field at step S705.

The next interface is invoked at step S714 using the configuration of the next interface. At least one field of the configuration includes data of a returned data field that was associated with the at least one field at step S709. The next interface is invoked for only one record of the received data.

Next data is received from the data source at step S715 in response to the invocation of the next interface. Since the data received in step S713 may include a plurality of records, it is determined at step S716 whether the data received in step S713 includes any additional records. If so, the next interface is again invoked using data of a next record received in step S713. Flow therefore cycles between steps S714 through S716 for each record of the received data.

At step S717, it is determined whether additional interfaces were defined during iterations of steps S707 through S710. If so, flow returns to step S714 and continues as described above. Steps S714 through S716 are therefore executed with respect to an additional interface for each record received in response to invocation of a previous interface. Interface 145 and data set 150 of FIG. 1 illustrate such an additional interface and received data according to some embodiments.

Flow continues from step S717 to step S718 if the determination at step S717 is negative. The component defined at step S701 is populated at step S718. Application environment 420 may populate the component by instantiating an object or a collection object (e.g., a table of two or more objects) and by populating the object or collection with the data received during each performance of steps S713 and S715. The object members may be associated with the received data based on the mappings defined at steps S705 and S710.

Steps S701 through S711 were described above as being executed by an administrator in conjunction with administration client 430. One or more of steps S701 through S711 may be performed by one or more administration clients 430 or other devices. Steps S701 through S711 may also be viewed as being performed by application environment 420 in response to input received from administration client 430.

Those in the art will appreciate that various adaptations and modifications of the above-described embodiments can be configured without departing from the scope and spirit of the claims. Therefore, it is to be understood that the claims may be practiced other than as specifically described herein.

What is claimed is:

1. A method comprising:
utilizing a first interface to query a data source using a first configuration and to return a first data set including a plurality of records, each of the plurality of records comprising data of a plurality of fields of the first data set;
receiving the first data set from the data source;
utilizing a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;
receiving a respective second data set from the data source for each utilization of the second interface; and
populating a class-based component model with data of the respective second data sets,
wherein the class-based component model represents tag-based data and non-tag-based data; and
wherein the second data set includes a second plurality of records, each of the second plurality of records including data of a second plurality of fields;
the method further comprising:
utilizing a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;
receiving a respective third data set from the data source for each utilization of the third interface; and
populating the class-based component model with data of the respective third data sets.

2. A method according to claim 1, further comprising:
populating the class-based component model with data of at least one of the plurality of fields of the first data set for each of the plurality of records.

3. A method according to claim 1, wherein populating the class-based component model comprises:
populating a collection of components of a class with data of at least one of the plurality of fields of the first data set and data of the second data set.

4. A method according to claim 1, further comprising:
configuring the first interface and the second interface.

5. A method according to claim 1, wherein the class-based component model represents assets and geographies of a manufacturing organization.

6. A method according to claim 1, wherein the tag-based data and non-tag-based data are derived from an industrial process.

7. A method according to claim 6, wherein the industrial process comprises a continuous process.

8. A method according to claim 6, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

9. A method according to claim 8, wherein the natural resource comprises at least one of oil and natural gas.

10. An apparatus comprising:
a memory storing processor-executable process steps; and
a processor in communication with the memory and operative in conjunction with the stored process steps to:
utilize a first interface to query a data source using a first configuration and to return a first data set including a plurality of records, each of the plurality of records comprising data of a plurality of fields of the first data set;
receive the first data set from the data source;
utilize a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;
receive a respective second data set from the data source for each utilization of the second interface; and
populate a class-based component model with data of the respective second data sets, wherein the class-based component model represents tag-based data and non-tag-based data;
wherein the second data set includes a second plurality of records, each of the second plurality of records including data of a second plurality of fields;
wherein the processor is further operative in conjunction with the stored process steps to:
utilize a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;
receive a respective third data set from the data source for each utilization of the third interface; and
populate the class-based component model with data of the respective third data sets.

11. An apparatus according to claim 10, the processor further operative in conjunction with the stored process steps to:
populate the class-based component model with data of at least one of the plurality of fields of the first data set for each of the plurality of records.

12. An apparatus according to claim 10, wherein population of the class-based component model comprises:
population of a collection of components of a class with data of at least one of the plurality of fields of the first data set and data of the second data set.

13. An apparatus according to claim 10, the processor further operative in conjunction with the stored process steps to:
configure the first interface and the second interface.

14. An apparatus according to claim 10, wherein the class-based component model represents assets and geographies of a manufacturing organization.

15. An apparatus according to claim 10, wherein the tag-based data and non-tag-based data are derived from an industrial process.

16. An apparatus according to claim 15, wherein the industrial process comprises a continuous process.

17. An apparatus according to claim 15, wherein the industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

18. An apparatus according to claim 17, wherein the natural resource comprises at least one of oil and natural gas.

19. An apparatus comprising: a non-transitory medium storing computer-executable program code, the program code comprising:
code to utilize a first interface to query a data source using a first configuration and to return a first data set including a plurality of records, each of the plurality of records comprising data of a plurality of fields of the first data set;
code to receive the first data set from the data source;
code to utilize a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;
code to receive a respective second data set from the data source for each utilization of the second interface; and
code to populate a class-based component model with data of the respective second data sets,
wherein the class-based component model represents tag-based data and non-tag-based data; and
wherein the second data set includes a second plurality of records, each of the second plurality of records including data of a second plurality of fields;
the program code further comprising:
code to utilize a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;
code to receive a respective third data set from the data source for each utilization of the third interface; and
code to populate the class-based component model with data of the respective third data sets.

20. An apparatus according to claim 19, wherein the code to populate the class-based component model comprises:
code to populate a collection of components of a class with data of at least one of the plurality of fields of the first data set and data of the second data set.

21. An apparatus according to claim 19, wherein the tag-based data and non-tag-based data are derived from a continuous industrial process.

22. An apparatus according to claim 21, wherein the continuous industrial process comprises operations of facilities involved in at least one of manufacturing, assembly, natural resource procurement, natural resource refinement, chemical synthesis, water treatment, power generation, power transmission, food processing, beverage processing, raw materials processing, agricultural processing, and materials processing.

23. A method according to claim 1, wherein the second configuration includes data from the one of the plurality of fields of the first data set that is associated with the field of the second configuration.

24. A method comprising:
utilizing a first interface to query a data source using a first configuration and to return a first data set including a plurality of records, each of the plurality of records comprising data of a plurality of fields of the first data set;
receiving the first data set from the data source;
utilizing a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;
receiving a respective second data set from the data source for each utilization of the second interface;
populating a class-based component model with data of the respective second data sets;
utilizing a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;
receiving a respective third data set from the data source for each utilization of the third interface; and
populating the class-based component model with data of the respective third data sets; and
wherein the class-based component model represents tag-based data and non-tag-based data.

25. An apparatus comprising:
a memory storing processor-executable process steps; and
a processor in communication with the memory and operative in conjunction with the stored process steps to:
utilize a first interface to query a data source using a first configuration and to return a first data set including a plurality of records, each of the plurality of records comprising data of a plurality of fields of the first data set;
receive the first data set from the data source;
utilize a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;

receive a respective second data set from the data source for each utilization of the second interface;

populate a class-based component model with data of the respective second data sets;

utilize a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;

receive a respective third data set from the data source for each utilization of the third interface; and populate the class-based component model with data of the respective third data sets;

wherein the class-based component model represents tag-based data and non-tag-based data.

26. An apparatus comprising: a non-transitory medium storing computer-executable program code, the program code comprising:

code to utilize a first interface to query a data source using a first configuration and to return a first data set including a plurality of records, each of the plurality of records comprising data of a plurality of fields of the first data set;

code to receive the first data set from the data source;

code to utilize a second interface to query the data source using a second configuration and to return a second data set for each of the plurality of records, at least one field of the second configuration being associated with one of the plurality of fields of the first data set, each utilization using the received data of the one of the plurality of fields of a respective record that is associated with the at least one field of the second configuration;

code to receive a respective second data set from the data source for each utilization of the second interface;

code to populate a class-based component model with data of the respective second data sets;

code to utilize a third interface to query the data source using a third configuration and to return a third data set for each of the plurality of records, at least one field of the third configuration associated with one of the second plurality of fields, each utilization using the received data of the one of the second plurality of fields of a respective record that is associated with the at least one field of the third configuration;

code to receive a respective third data set from the data source for each utilization of the third interface; and code to populate the class-based component model with data of the respective third data sets;

wherein the class-based component model represents tag-based data and non-tag-based data.

* * * * *